(12) United States Patent
Schmid (10) Patent No.: US 11,252,010 B2
(45) Date of Patent: Feb. 15, 2022

(54) SYSTEM FOR CONTROLLING AND MONITORING ADAPTIVE CYBERPHYSICAL SYSTEMS

(71) Applicant: Siemens Aktiengesellschaft, Munich (DE)

(72) Inventor: Reiner Schmid, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/540,370

(22) Filed: Aug. 14, 2019

(65) Prior Publication Data

US 2020/0059394 A1    Feb. 20, 2020

(30) Foreign Application Priority Data

Aug. 16, 2018 (EP) .................... 18189252

(51) Int. Cl.
*H04L 12/24* (2006.01)
*H04L 12/26* (2006.01)
*H04L 29/06* (2006.01)

(52) U.S. Cl.
CPC ........ *H04L 41/046* (2013.01); *H04L 41/0816* (2013.01); *H04L 43/045* (2013.01);
(Continued)

(58) Field of Classification Search
CPC . H04L 63/1433; H04L 63/20; H04L 63/1416; H04L 63/1441; H04L 63/145;
(Continued)

(56) References Cited

U.S. PATENT DOCUMENTS

| 7,668,773 B1* | 2/2010 | Pruitt | G06Q 40/10 705/36 T |
| 8,099,257 B2* | 1/2012 | Parvin | G16H 10/40 702/179 |

(Continued)

FOREIGN PATENT DOCUMENTS

| CN | 109067264 A | * 12/2018 |
| DE | 102012110802 A1 | 11/2013 |

(Continued)

OTHER PUBLICATIONS

Non-English European Search Report for Application No. 18189252. 2, dated Mar. 11, 2019.

*Primary Examiner* — Ninos Donabed
(74) *Attorney, Agent, or Firm* — Schmeiser, Olsen & Watts, LLP (57) ABSTRACT

Provided is a system for monitoring and controlling an adaptive cyberphysical system consisting of or comprising one or more system components, in which an engineering system is connected to a monitoring and supervision module (that is designed or configured to receive and to process data from the system components and to forward the processed data and information generated therefrom to the engineering system, wherein the engineering system is designed or configured to update management technology images in a management and control system on the basis of the data received from the monitoring and supervision module.

7 Claims, 3 Drawing Sheets

(52) U.S. Cl.
CPC ........ *H04L 43/0817* (2013.01); *H04L 63/102* (2013.01); *H04L 63/166* (2013.01); *H04L 63/20* (2013.01)

(58) Field of Classification Search
CPC ............... H04L 63/1466; H04L 41/046; H04L 41/0816; H04L 43/045; H04L 43/0817; H04L 63/102; H04L 63/166; G06F 21/577; G06F 21/554; G06F 21/50; G06F 21/55; G06F 21/552; G06F 1/24; G06F 21/566; G06F 21/57; G06F 30/20; G06Q 40/02; G06N 20/00; G06N 5/022; G06N 5/045

See application file for complete search history.

(56) References Cited

U.S. PATENT DOCUMENTS

| | | | |
|---|---|---|---|
| 9,946,858 B2* | 4/2018 | Wallrabenstein | G06F 21/31 |
| 10,362,056 B1* | 7/2019 | El Hariri | H04L 63/1466 |
| 10,409,980 B2* | 9/2019 | Diehl | H04L 41/145 |
| 10,432,409 B2* | 10/2019 | Wallrabenstein | H04L 9/3278 |
| 2004/0260404 A1 | 12/2004 | Russell et al. | |
| 2008/0189679 A1* | 8/2008 | Rodriguez | G06F 8/34 |
| | | | 717/105 |
| 2013/0101206 A1* | 4/2013 | Dedeoglu | G06T 7/11 |
| | | | 382/154 |
| 2013/0152198 A1 | 6/2013 | Akiyama et al. | |
| 2013/0198847 A1* | 8/2013 | Sampigethaya | H04L 63/1433 |
| | | | 726/25 |
| 2014/0081652 A1* | 3/2014 | Klindworth | G16H 40/20 |
| | | | 705/2 |
| 2014/0156031 A1* | 6/2014 | Anderson | G06Q 10/06 |
| | | | 700/29 |
| 2014/0189776 A1* | 7/2014 | Diehl | H04L 41/145 |
| | | | 726/1 |
| 2014/0283047 A1* | 9/2014 | Dixit | G06F 21/55 |
| | | | 726/23 |
| 2015/0180503 A1* | 6/2015 | Schubert | G06F 30/367 |
| | | | 341/143 |
| 2016/0041535 A1* | 2/2016 | Leonardi | G05B 23/0267 |
| | | | 700/29 |
| 2017/0034205 A1* | 2/2017 | Canedo | H04L 63/1416 |
| 2017/0336765 A1* | 11/2017 | Lovett | G06F 9/5094 |
| 2017/0357808 A1* | 12/2017 | Arroyo | H04L 63/1441 |
| 2018/0075243 A1* | 3/2018 | Thomas | G06F 30/20 |
| 2018/0198812 A1* | 7/2018 | Christodorescu | H04L 63/1425 |
| 2018/0205727 A1* | 7/2018 | Hwang | H04L 63/08 |
| 2018/0337932 A1* | 11/2018 | Juster | H04L 9/3234 |
| 2019/0025435 A1* | 1/2019 | Horowitz | H04W 12/1202 |
| 2019/0087571 A1* | 3/2019 | Rane | G06F 21/554 |

FOREIGN PATENT DOCUMENTS

| | | | |
|---|---|---|---|
| EP | 1492310 A2 | 12/2004 | |
| WO | 2013023178 A1 | 2/2013 | |
| WO | 2013171234 A1 | 11/2013 | |
| WO | 2018048351 A1 | 3/2018 | |
| WO | WO-2018048351 A * | 3/2018 | ......... H04L 63/1416 |

* cited by examiner

FIG 4

SYSTEM FOR CONTROLLING AND MONITORING ADAPTIVE CYBERPHYSICAL SYSTEMS

CROSS-REFERENCE TO RELATED APPLICATIONS

This application claims priority to EP Application No. 18189252.2, having a filing date of Aug. 16, 2018, the entire contents of which are hereby incorporated by reference.

FIELD OF TECHNOLOGY

The following relates to a system for monitoring and controlling an adaptive cyberphysical system consisting of or comprising one or more system components.

BACKGROUND

The creation of modern automated installations, such as for example production cells in the automotive industry or in any other production installation, is based on the concept of cyberphysical systems. A cyberphysical system denotes the combination of computerized, software-based components with mechanical and electronic elements that communicate via a data infrastructure, such as for example the Internet, and is characterized by a high degree of complexity. Cyberphysical systems are formed by networking embedded system components by way of wired or wireless communication networks. Cyberphysical systems cover a broad spectrum of possible fields in which they are able to be used. These include medical devices and systems, traffic control and traffic logistics systems, networked safety and vehicle assistance systems in the automotive field, industrial process control and automation systems in manufacturing, energy supply management systems, infrastructure systems for telecommunications, etc.

The design of cyberphysical systems requires different components to be integrated on different levels to form an overall system, in particular components on the physical and electrical level. There are furthermore network-based requirements that have to be met. Event integration and data flow integration is furthermore necessary. Physical procedural requirements furthermore need to be borne in mind, and the individual components ultimately also need to be embedded into a control hierarchy.

It may furthermore be observed that information technology (IT) is becoming increasingly prevalent in fields in which it barely played a role in the past. In the meantime, this trend constitutes one of the greatest drivers of innovation. Computers embedded in everyday objects that are networked with one another or the Internet for the first time allow new functions, such as for example functions for assistance systems in a vehicle. Cyberphysical systems constitute the technological basis for combining IT with the physical world, and play an important role in an increasing number of fields, such as for example the automotive field, aviation, transport, energy, production, health, infrastructure but also entertainment.

The growing popularity and spread of cyberphysical systems and the fact that they are increasingly used to process and store security-critical and data-protection-sensitive data however also makes these systems attractive targets for a variety of software and hardware attacks. Successful attacks may have significant consequences, particularly in the automotive field or in the medical sector.

The practical use of cyberphysical systems, in particular in security-critical fields of application, requires careful consideration of security and data protection aspects even when these systems are designed (security and privacy by design).

Both the platform security and the security of the various communication connections have to be taken into consideration, as well as the security on the application, architectural and technological level. Suitable software-based and hardware-based solutions in this case have to meet the specific requirements of cyberphysical systems, for example resource restrictions for certain devices, physical accessibility, real-time requirements for particular functions or cost efficiency. Cyberphysical systems are often also used in fields that were not previously linked to the IT world, or were linked only to a small extent. Existing protective measures and conventional IT security concepts have therefore proved insufficient in practice. Special adaptations or new developments are often necessary.

The multidimensional integration of individual components into an overall system therefore has to meet both the objective of the system (requirements), but also in particular non-functional boundary conditions, such as for example security and data protection, and additionally offer traceability guarantees for the properties of the individual components. In industrial practice, such systems are for example automated manufacturing and process installations for producing a product based on programmable logic controllers (PLCs) in which the majority of the processes are implemented in a computer-controlled manner. After the product design phase, production planning is normally performed. For this purpose, production engineering is carried out, in which the mechanics, electrics and automation of the production installation are defined. After simulating the production engineering on a computer, such a production installation is generally put into operation. During the production execution, the overall installation is controlled and monitored by way of a management and control system (SCADA system). SCADA software systems make it possible to view processes with graphical depictions of sub-processes and/or overall processes in order to depict current system states clearly and descriptively. These graphical representations are able to be produced quickly by the user or the operator of an installation. Historic data management, user-specific rights handling, alerting in the case of critical system states are integrated as standardized tools.

Such production systems are configured and programmed using an engineering system that provides the configuration data necessary for the system to function and information about the technical processes in the system. The management and control system (SCADA system) is configured, or at least the interfaces for use thereof are provided, on the basis thereof. Such an engineering system is for example the TIA portal (totally integrated automation portal) with its incorporation of device-specific applications, such as for example compilers for PLCs, editors for screen depictions and screen masks, panels and/or management and control systems (SCADA systems).

Using the engineering system, on the basis of defined application scenarios, different devices are integrated into an overall system. One example is the integration of all of the PLCs of a production cell in a factory into the overall process of the overall production. Other examples are found in the medical field, such as in hospital management or in the automotive field in drive systems and driving assistance systems.

In the engineering system, functionalities such as error detection and runtime and process functionality monitoring, which are normally parts of the runtime system, are also defined.

It is however expected in the future that the power of such cyberphysical systems will be able to be increased significantly by applying artificial intelligence methods and by using what are known as complex adaptive systems that are distinguished by an autonomous behavior and learning capability.

Complex adaptive systems are complex because they consist of a plurality of interconnected elements, and they are adaptive because they exhibit a specific ability to adapt to their environment and have the possibility of learning (from experience).

However, the use of what are known as adaptive systems, in which the behavior of a system is no longer defined in detail during an engineering phase before being put into operation, but is rather implemented by self-learning mechanisms, constitutes a new requirement on the engineering system.

When creating adaptive cyberphysical systems, due to their dynamics (autonomous reconfiguration) and complexity (heterogeneity and number of components involved), it is not possible to create these functionalities in full before the system is put into service, since the number of variations (variation space) of the configurations is not clear and in part also no longer able to be depicted. The principle of emergence applies to adaptive cyberphysical systems, since new properties and structures of a system are formed only due to a new interaction of its elements. Examples are increasing customization in production in order to take individual client wishes into consideration, but also the trend for customized medicine in the medical sector, where medicines are increasingly being tailored to the individual requirements of a patient.

It is conceivable for example in vehicle production for individually configured vehicle specifications (for example color, materials, etc.) to be forwarded directly to a production installation. Amended production processes based on the incoming client wishes, for example with regard to the selection of the color of a vehicle, which were previously not possible for logistic and organizational reasons, are thus conceivable. As a result, new processes are able to be generated on the basis of the incoming data, which would previously have been processed only linearly, for example using the time of arrival of the client wishes. In an adaptive system, however, other and new interconnections are able to be created that then lead to amended production processes, which may in turn increase the efficiency of the overall production. By using adaptive systems, such as for example self-organizing robots, the variability of the processes is increased, and it is in particular no longer able to be planned in advance, but rather is subject to non-linear, dynamic control. Rather than a specification that is exact in terms of processes, target variables, behavioral guidelines or the like are defined, and learning data are specified.

Traditional engineering systems, such as for example the mentioned TIA portal, are however not able to support this type of system, since they are based on predefined processes that run substantially linearly. There is therefore the need to expand these engineering systems with the possibilities that arise through the use of adaptive systems. On the other hand, however, a factory automation system that is based on adaptive units, for example cyberphysical production units, also requires for example connection to a conventional management technology system that offers operators the possibility of monitoring and intervening.

New requirements are therefore placed on currently available engineering systems since, on the one hand, a variant space of configuration possibilities that is not defined in advance is intended to be supported, but at the same time a depiction of the system state is intended to be delivered that, in view of the objectives, is able to give the operators of the system a suitable overview of the relevant information and possibilities of action.

A connection to management technology systems is usually created on the basis of the information, stored in the engineering system, about the system, that is to say management technology images for displaying the system state are defined on the basis of this database. However, the problem then arises here that, due to the large multiplicity of possible variants that an adaptive system is able to adopt during operation, such management technology images are no longer able to be created statically in an expedient manner.

The challenge exists for autonomous adaptive systems that the engineering systems and the management technology systems have to reproduce the reconfiguration possibilities and therefore the required changes so that expedient supervision and control of these autonomous adaptive systems is possible.

This challenge applies to an equal extent to detecting and reporting error states of the system. In this case, there is no longer any causal chain that is able to be analyzed completely in advance, but rather the assessment has to be made on the basis of the current configuration or the current state of the system.

Up until now, for complex technical systems, there has been no satisfactory solution that connects artificial intelligence methods, such as the use of adaptive systems, with traditional engineering and management technology systems.

The use of a "digital twin" that simulates the state of such systems and, from this, enables assessments with regard to the state of the system, is discussed. Such a conventional approach however does not offer the possibility of performing automatic analysis of the underlying cause of error and possibilities of action in the event of an error.

Complex technical systems are normally provided with management technology systems that monitor the state of the installation and report error functions. In this case, deviations from the desired operating state of a technical component of the system are reported. By way of example, in the event of a failure of a pressure sensor or in the event of threshold values of the measured pressure being exceeded, alarm notifications are generated. Based on the incoming singular error notifications, however, there is no conclusion as to the remaining functionality of the technical installation. In many cases, a quick response from the operator is necessary in order to initiate the necessary responses to the disturbance.

Other examples of the requirement for dynamic system analysis and control when using adaptive system components are found in the automotive field, for example in driving assistance systems, in the medical field in hospital management, in pharmaceutical research in medicine development, in the banking field in cash management, such as for example filling level monitoring in automated teller machines, in trade (retail) in client and stock management. Adaptive elements and processes that are influenced by non-linear, dynamic characteristic variables are found in all of these fields, such as for example client wishes in the textile industry due to constantly changing fashion or the changing of the seasons.

SUMMARY

An aspect relates to creating a system for reliably controlling and monitoring a cyberphysical system having adaptive system components, which system is distinguished by high stability and security.

Embodiments of the invention relate to a system for monitoring and controlling an adaptive cyberphysical system consisting of or comprising one or more system components, in which an engineering system is connected to a monitoring and supervision module that is designed to or configured to receive and to process data from the system components and to forward the processed data and information generated therefrom to the engineering system, wherein the engineering system is designed to or configured to update management technology images in a management and control system on the basis of the data received from the monitoring and supervision module.

The engineering system is thus able to take reconfiguration decisions for the adaptive system, which are made by way of artificial intelligence methods, and track newly learned behaviors of the components, in accordance with updates to the management technology images, and thereby to allow accurate monitoring and control of the system state for the system operator. Dynamic and non-linear changes, as are typical for adaptive systems, are in particular able to be tracked accurately and precisely and depicted in corresponding graphics (management technology images).

According to one advantageous development, the management and control module is connected to the system components of the adaptive system and designed to configured to receive and to process data from the system components.

Advantageously, the engineering system is connected to the system components and designed to or configured to transmit data to the system components and thereby to control the system components.

According to a further configuration of embodiments of the invention, the management and control system is connected to the system components and designed to or configured to transmit data to the system components and thereby to control the system components.

The engineering system may furthermore comprise an error model generator for generating error models of the adaptive system on the basis of the data arriving from the monitoring and supervision module.

In a further advantageous configuration of embodiments of the invention, the engineering system comprises a management and control system configurator that is designed to or configured to generate and to process management technology images (graphs, diagrams, tables, etc.).

According to a further development of embodiments of the invention, a "digital twin" of the adaptive system is provided that is designed to or configured to simulate the adaptive system during the operating phase on the basis of configuration data generated in the planning phase.

According to a second aspect, embodiments of the invention relate to a method for monitoring and controlling an adaptive cyberphysical system consisting of or comprising one or more system components, in which an engineering system is connected to a monitoring and supervision module that receives and processes data from the system components and forwards the processed data and information generated therefrom to the engineering system, wherein the engineering system updates management technology images in a management and control system on the basis of the data received from the monitoring and supervision module.

In one advantageous configuration of the method according embodiments of to the invention, the management and control module is connected to the system components of the adaptive system and receives data from the system components and processes said data.

Advantageously, the engineering system is connected to the system components and transmits data to the system components in order thereby to control the system components.

In a further configuration of the method according to embodiments of the invention, the management and control system is connected to the system components and transmits data to the system components in order thereby to control the system components.

According to one advantageous further development of the method according to embodiments of the invention, the engineering system comprises an error model generator that generates error models of the adaptive system on the basis of the data transmitted by the monitoring and supervision module.

According to a third aspect, embodiments of the invention relate to an engineering system that is designed or configured for use in a system for monitoring and controlling an adaptive cyberphysical system.

According to a fourth aspect, embodiments of the invention relate to a management and control system that is designed or configured for use in a system for monitoring and controlling an adaptive cyberphysical system.

According to a fifth aspect, embodiments of the invention relate to a computer program product (for example, non-transitory computer readable storage medium having instructions, that when executed by a processor, perform actions) that contains one and/or more executable computer codes for executing the method.

BRIEF DESCRIPTION

Some of the embodiments will be described in detail, with reference to the following figures, wherein like designations denote like members, wherein.

DETAILED DESCRIPTION

Figure 1:
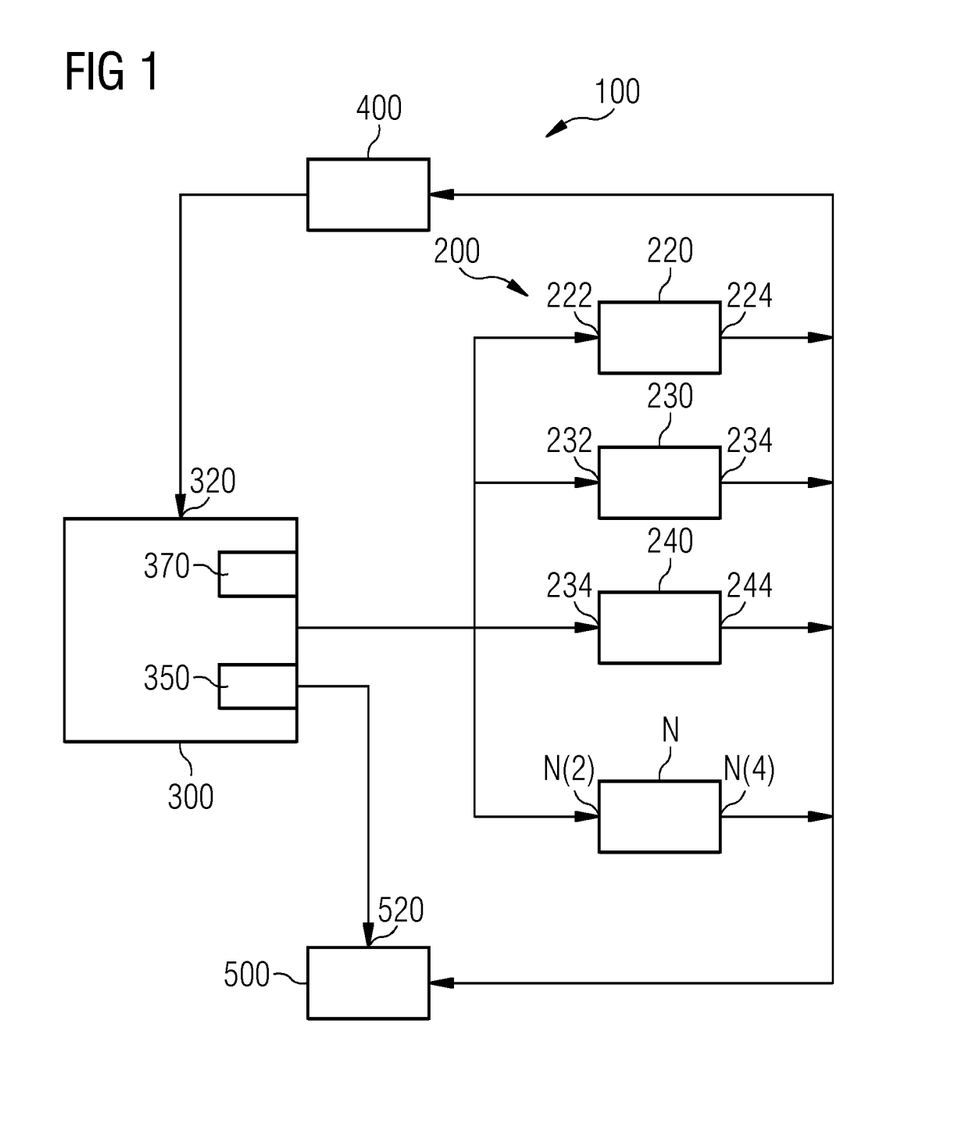
FIG. 1 shows an overview of a system according to embodiments of the invention.

FIG. 1 shows a system 100 for monitoring and controlling an adaptive system 200 having the components 220, 230, 240, . . . N. The components 220, 230, 240, . . . N of the adaptive system 200 have interfaces 222, 232, 242, . . . N(2) that connect it to the engineering system 300 for data transmission purposes. By virtue of the interfaces 222, 322, 242, . . . N(2), the necessary infrastructure and configuration is ensured in the components 220, 230, 240, . . . N. A monitoring and supervision module 400 is likewise connected via interfaces 224, 234, 244, . . . N(4) to the components 220, 230, 240, . . . N of the adaptive system 200 and receives, from the components 220, 230, 240 . . . N, data containing information about the operating state, learned behavior, the respective configuration and planning scenarios of the components 220, 230, 240 . . . N. The monitoring and supervision module 400 is connected to the engineering system 300 via an interface 320 and forwards the compiled and possibly further-processed and aggregated data and information to the engineering system 300. The engineering system 300 processes the received data and information and communicates with a management and control system (SCADA system) 500 via an interface 520. Depending on the received and processed data and information, the engineering system 300 defines whether changes or updates are necessary in the management and control system (SCADA system) 500.

Advantageously, the engineering system 300 for this purpose has a management and control system configurator 350. This configurator 350 may furthermore be designed or configured such that it generates management technology images (graphs, diagrams, tables, etc.) for complex systems, such as for example industrial installations. The engineering system 300 may furthermore contain an error model generator 370. The individual system components 220, 230, 240, . . . N may furthermore communicate and exchange data with the management and control system 500 separately and/or in parallel and/or in series and/or in the manner of a network via the interfaces 224, 234, 244, . . . N(4). In addition to the indicated interfaces 224, 234, 244, . . . N(4), however, even more interfaces, which are not indicated in FIG. 1, are also possible. The management and control system 500 may furthermore also directly communicate and exchange data with the system components 220, 230, 240, . . . N of the adaptive system 200 directly via the indicated interfaces or further interfaces in order thereby to change operating states of the system components 224, 234, 244, . . . N(4) in the context of known open-loop and closed-loop control circuits.

The adaptive system 200, based on planning scenarios, uses the configuration possibilities of its components 220, 230, 240, . . . N to solve the tasks transmitted thereto. It is therefore able to change the configuration of the components 220, 230, 240, . . . N and adapt it to a set task, for example a quick response to production specifications that are to be newly defined due to changed boundary conditions (change of client wishes, supply difficulties of basic components in chemical production, price fluctuations of components, etc.). These reconfiguration possibilities of an adaptive system 200 are taken into consideration according to embodiments of the invention in the engineering system 300.

Figure 2:
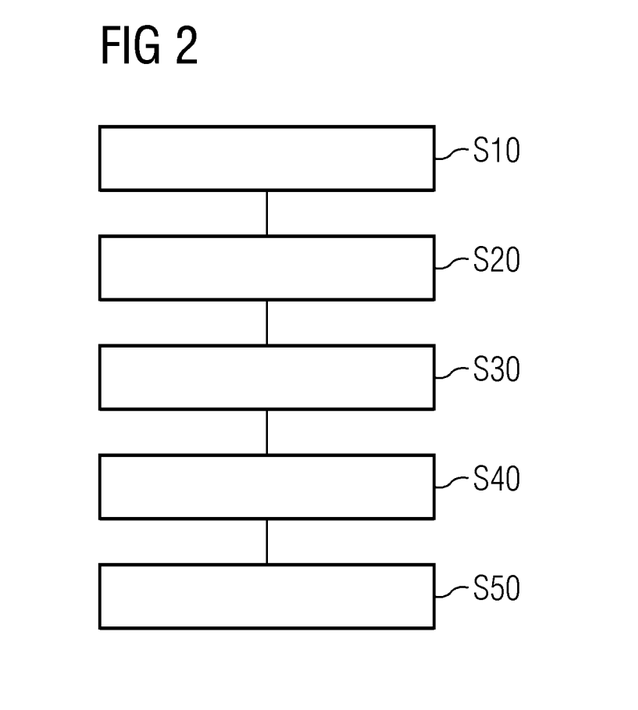
FIG. 2 shows a flowchart of an engineering system according to embodiments of the invention.

FIG. 2 illustrates a flowchart for the function of the engineering system 300.

In a step S10, the engineering system 300 is activated during the runtime of the adaptive system 200. It contains, in an error model generator 370, algorithms for generating an error model and for creating management technology images (diagrams, graphics, tables, etc.).

In a step S20, the engineering system 100 receives, from the monitoring and supervision module 400, information about the system components 220, 230, 240, . . . N with regard to its state, its learned behavior and further planning information that has either been generated directly by the components 220, 230, 240, . . . N or has been created by the supervision module 400 by way of an algorithm that is not described in more detail here.

In a step S30, the engineering system 300 acquires the state of the adaptive system 200 from the information forwarded by the monitoring and supervision module 400. It is furthermore also possible in the context of embodiments of the invention for the engineering system 300 to communicate directly with the individual components 220, 230, 240, . . . , N, either with all of the components 220, 230, 240, . . . , N at the same time or with one or more selected component(s).

In a step S40, the engineering system 300 creates required changes to the error models and the management technology images that are stored in the error model generator 370 and the management and control system configurator 350.

In a step S50, the updates, performed by way of predefined algorithms, to the management technology images and to the error warning system are forwarded by the engineering system 300 to the management and control system 500 or also to the monitoring and supervision module 400.

Figure 3:
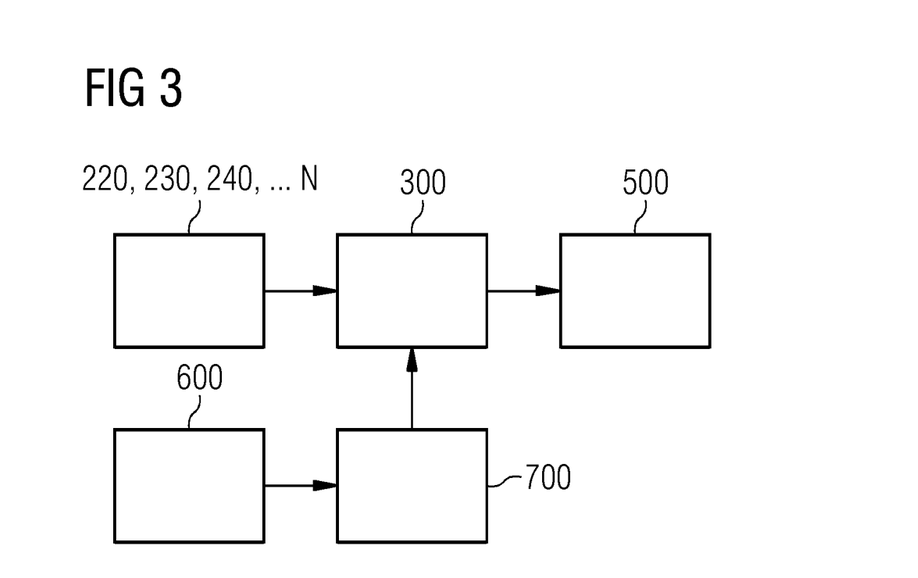
FIG. 3 shows a block diagram of an optional implementation detail of the system according to embodiments of the invention.

FIG. 3 shows a flowchart for generating and updating management technology images as are depicted in the management and control system (SCADA system) 500. Based on the information about the system components 220, 230, 240, . . . N, a management technology image (graphics, diagram, table, etc.) corresponding to the current system state is generated by the engineering system 300 and depicted in the management and control system (SCADA) 500. The generated management technology image displays for example the components 220, 230, 240, . . . N of the system 200 that are currently being used, but also the overall system state. The function of the individual components 220, 230, 240, . . . N may furthermore be depicted with regard to the production targets. Comparisons with historic data that are stored in system libraries and/or other databases are also possible. It is thereby able to be ensured that the operator of an installation receives a complete and expedient depiction of the production operation at all times. A comparison between the planning information 600 and target specifications 700 is in particular possible, such that, in the event of a deviation between the current state and the planning scenarios, control commands are able to be output to the individual components 220, 230, 240, . . . N in order to change their operating behavior such that the target specifications are able to be achieved.

Figure 4:
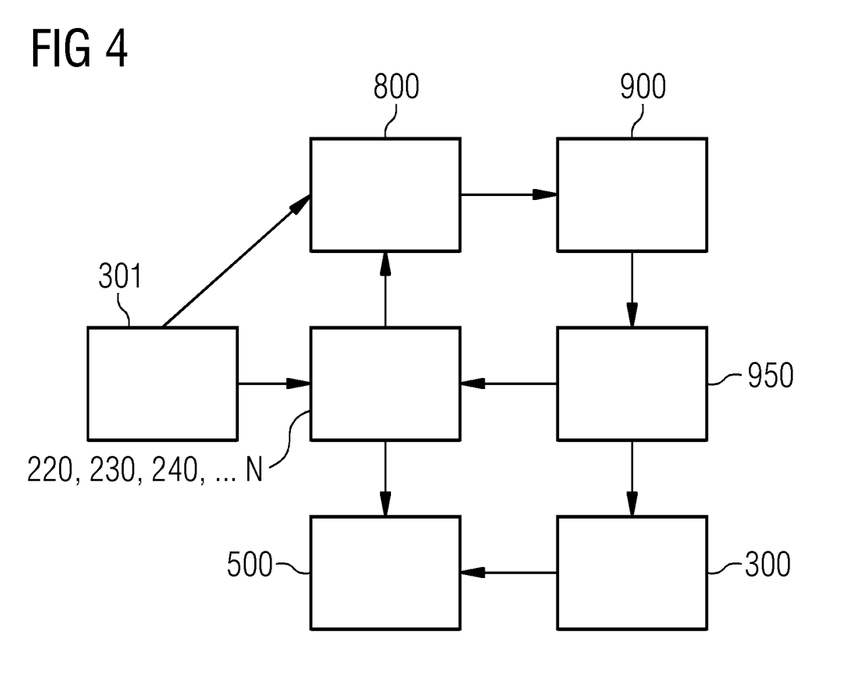
FIG. 4 shows a further block diagram of a second optional implementation detail of the system according to embodiments of the invention.

FIG. 4 shows an implementation variant in which the adaptive system 200 uses a "digital twin" 800 that digitally mirrors, that is to say simulates, the adaptive cyberphysical system 200 in synchronicity with the operation, and delivers the input for a planning component 900 that retroacts, via a configuration manager 950, on the system components 220, 230, 240, . . . N and controls them in accordance with the planning. In this configuration, the configuration manager 950 acts during operation of the adaptive system 200 at the point of the direct connection of the engineering system 300 to the components, as illustrated in FIG. 1 (online operation). In the phase before the adaptive system 200 is put into service (offline phase), the engineering system 301 may however communicate directly with the system components 220, 230, 240, . . . N in order to program and to configure them. The engineering system 300 additionally communicates directly with the management and control system (SCADA system) 500.

According to embodiments of the present invention, an engineering system 300 is provided during operation of an adaptive system 200. Dynamic monitoring and control of the adaptive system 200 is thereby possible during operation, such that security is increased considerably, since the current state of the overall system 200 is able to be depicted at all times.

The engineering system 300 is able to take reconfiguration decisions for the adaptive system 200, which are made by way of artificial intelligence methods, and track newly learned behaviors of the components 220, 230, 240 . . . N, in accordance with updates to the error model generator 370 and the management technology images, and thereby to allow accurate monitoring and control of the system state for the system operator. Dynamic and non-linear changes, as are typical for adaptive systems, are in particular able to be tracked accurately and precisely and depicted in corresponding graphics (management technology images).

By virtue of embodiments of the present invention, due to the flow of data between the individual components 220, 230, 240 . . . N of the adaptive system 200 and the engineering system 300, the system depiction is thus able to be adjusted dynamically to a reconfiguration or change of target of the adaptive system 200. This allows continuous updating (update capability) of management technology images such as graphics, tables, diagrams, etc. that reflect the state of the current adaptive system 200 or compare it with historic data images (SCADA images). An exchange of data with the error model generator 370 furthermore takes place. Convergence between the actual current state (present configuration) of the adaptive system and its computer-based and graphical depiction is thereby ensured. Updating the error model generator 370 allows a meaningful interpretation of error cases, in particular in the comparison mode with historic data.

In a further development of embodiments of the invention, there is provision, in addition to adaptive system components 220, 230, 240 . . . N that form the adaptive system 200, also to integrate a traditional system consisting of or comprising system components to form an overall system, wherein this overall system is monitored and controlled by the engineering system 300. When controlling and monitoring the traditional system, the engineering system 300 may resort to known processes and procedures and connect these to the dynamic control, described here, of the adaptive system 200.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for monitoring and controlling an adaptive cyberphysical system, wherein the adaptive cyberphysical system includes one or more system components, the system for monitoring and controlling comprising:
   a monitoring and supervision module having a processor;
   an engineering system connected to the monitoring and supervision module, wherein the engineering system comprises a management and control system configurator that is configured to generate and to process management technology images;
   wherein the monitoring and supervision module is configured to receive and to process data from the one or more system components and to forward the processed data and information generated therefrom to the engineering system,
   wherein the engineering system is connected to a management and control system and configured to receive the processed data and information generated therefrom from the monitoring and supervision module and update the management technology images in the management and control system on the basis of the received processed data and information generated therefrom,
   wherein the engineering system is connected to the one or more system components and is configured to transmit data to the one or more system components and thereby to control the one or more system components,
   wherein the engineering system comprises an error model generator for generating error models of the adaptive cyberphysical system on the basis of the data arriving from the monitoring and supervision module, and
   wherein a digital twin of the adaptive cyberphysical system is provided that is configured to simulate the adaptive cyberphysical system during an operating phase on the basis of configuration data generated in a planning phase.

2. The system as claimed in claim 1, wherein the management and control system is connected to the one or more system components of the adaptive cyberphysical system and is configured to receive and to process data from the one or more system components.

3. The system as claimed in claim 1, wherein the management and control system is connected to the one or more system components and is configured to transmit data to the one or more system components and thereby to control the one or more system components.

4. A method for monitoring and controlling an adaptive cyberphysical system, the adaptive cyberphysical system having one or more system components, the method comprising:
   receiving, by a monitoring and supervision module having a processor, data from the one or more system components;
   processing, by the monitoring and supervision module, the received data from the one or more system components;
   forwarding, by the monitoring and supervision module, the processed data to an engineering system connected to the monitoring and supervision module, wherein the engineering system comprises a management and control system configurator that is configured to generate and to process management technology images;
   updating, by the engineering system, the management technology images in a management control system on the basis of the forwarded data, wherein the management control system is connected to the engineering system,
   wherein the engineering system is connected to the one or more system components and transmits data to the one or more system components and thereby controls the one or more system components,
   wherein the engineering system comprises an error model generator for generating error models of the adaptive cyberphysical system on the basis of the data arriving from the monitoring and supervision module,
   wherein a digital twin of the adaptive cyberphysical system is provided that is configured to simulate the adaptive cyberphysical system during an operating phase on the basis of configuration data generated in a planning phase.

5. The method as claimed in claim 4, wherein the management and control system is connected to the one or more system components of the adaptive system and receives and processes data from the one or more system components.

6. The method as claimed in claim 4, wherein the management and control system is connected to the one or more system components and transmits data to the one or more system components and thereby controls the one or more system components.

7. A computer program product comprising a computer readable hardware storage device having computer readable program code stored therein, said program code executable by a processor of a computer system to implement the method for monitoring and controlling an adaptive cyber-physical system as claimed in claim 4.

\* \* \* \* \*